Aug. 13, 1929.  T. F. HOLDEN  1,724,402

MEANS AND METHOD OF FEEDING FUEL TO GAS GENERATORS

Filed Feb. 4, 1926  2 Sheets-Sheet 1

Inventor,
Thomas F. Holden
By Jas. L. Skidmore
his Attorney.

Aug. 13, 1929.  T. F. HOLDEN  1,724,402
MEANS AND METHOD OF FEEDING FUEL TO GAS GENERATORS
Filed Feb. 4, 1926  2 Sheets-Sheet 2

Inventor,
Thomas F. Holden
By Jas. L. Skidmore
his Attorney.

Patented Aug. 13, 1929.

1,724,402

UNITED STATES PATENT OFFICE.

THOMAS F. HOLDEN, OF WASHINGTON, DISTRICT OF COLUMBIA, ASSIGNOR OF ONE-THIRD TO ROBERT D. WEAVER, OF WASHINGTON, DISTRICT OF COLUMBIA, AND ONE-THIRD TO CALVIN VOS, OF NEW YORK, N. Y.

MEANS AND METHOD OF FEEDING FUEL TO GAS GENERATORS.

Application filed February 4, 1926. Serial No. 86,019.

This invention pertains to an improved novel means and method of charging fuel into the coaling hole of a water gas generator of the type shown in the patent granted to me under date of September 23, 1924, Numbered 1,509,554, or any other type of producer or generator, in the manufacture of water gas.

The prime object of this invention is to provide simple, economical, durable and highly efficient means for charging fuel into a gas generator during the down run only in substantially measured quantities as may be required by the generator or producer.

Another object of the invention is to so construct my charging means that the generator is charged periodically with the desired amount of fuel while the charger remains sealed against the escape of gas from said generator.

A further object of the invention is to provide means properly connected with the generator to effectively distribute the finer particles of the fuel as it is being fed into the generator and simultaneously gasify said particles, or fine fuel.

Further objects of the invention are to so construct the charging device that it is gas sealed at all times, thus preventing the escape of gas into the atmosphere; that said charging device can be easily and readily removed away from the charging hole of the generator and replaced in its proper charging position when desired; that the desired specified amount of fuel is fed into the generator at each charging operation, and to prevent the emission of dense black smoke into the atmosphere, which usually occurs during the fuel charging operation by the use of the means and methods now employed.

The foregoing and such other objects as may appear from the ensuing description are accomplished by the construction, location, arrangement and combination of the several parts hereinafter more fully described, illustrated in the accompanying drawings, and particularly pointed out in the claims appended hereto, it being understood that slight changes in the proportions and minor details of construction may be resorted to without departing from the spirit or sacrificing any of the advantages of the invention.

In the accompanying drawings forming a part of this specification it will be seen that:—

Figure 1:
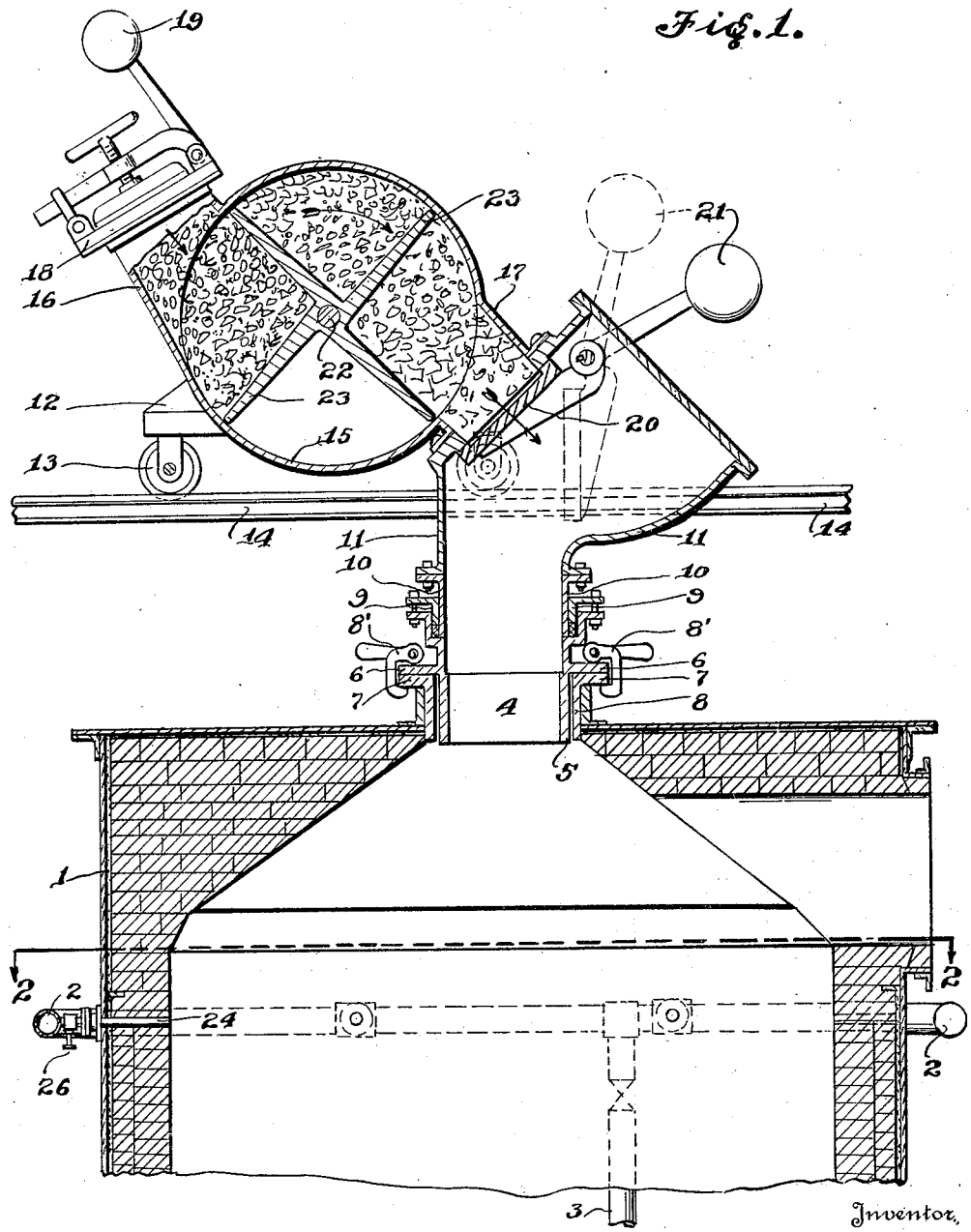
Figure 1 is a central sectional elevation taken through the generator and fuel feeding means therefor, showing a portion of the feeding means in elevation.
Figure 2:
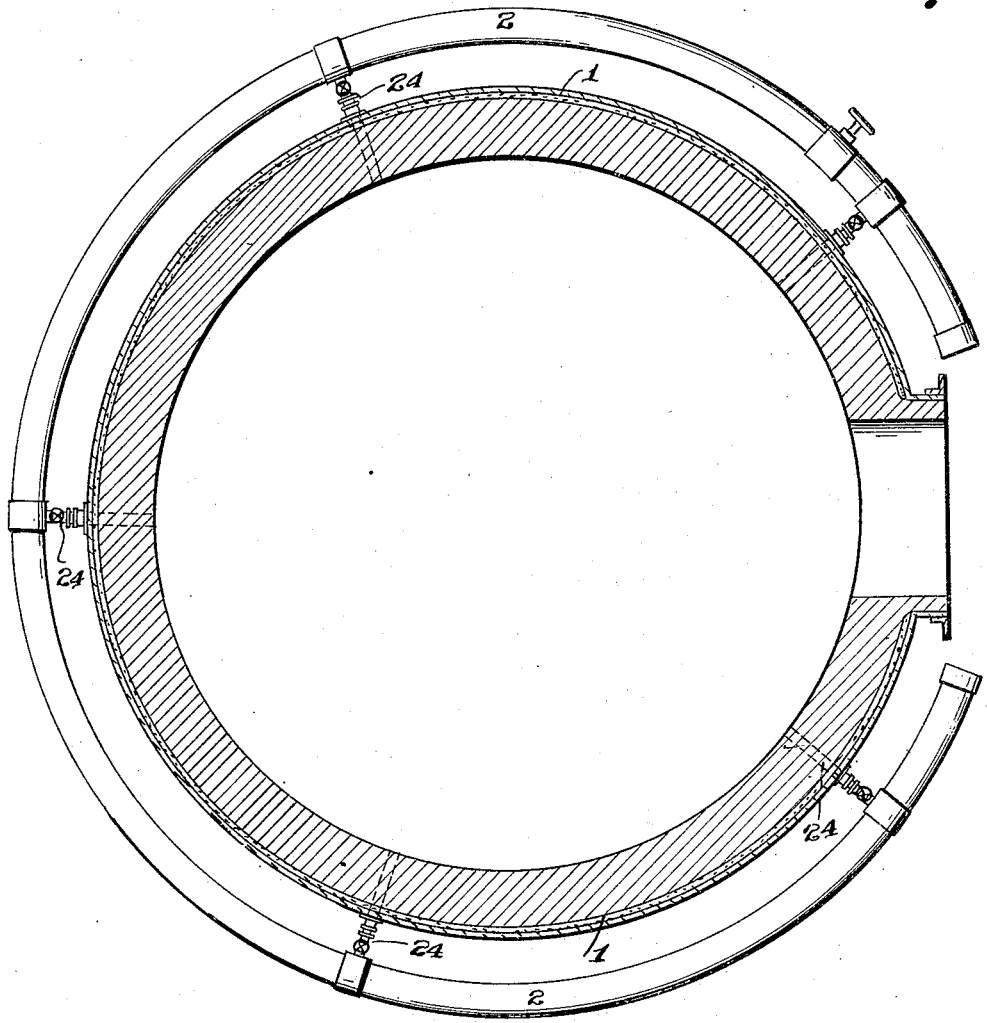
Figure 2 is a horizontal section through the generator taken in the plane of the dotted line 2—2, Fig. 1, looking in the direction of the arrows.

In the embodiment of my invention as illustrated it will be seen that the numeral 1 designates the upper end portion of a water gas generator of the up and down run type, and near the upper end of said generator practically surrounding the body portion thereof, and suitably supported and disposed above the fuel bed of the generator is a steam manifold 2 having a steam supply pipe 3 connected therewith, the purpose and operation of said steam manifold being hereinafter more fully described.

At the central top portion of the generator is formed a hole or opening 4, which is surrounded by a pipe or casting 5 of any desirable metal provided with an outwardly extended flange 6 seated in contact with the flanged portion 7 of the metallic pipe section or casting 8, said pipe or casting 5 being secured to the flanged portion 7 in sealed contact therewith by a plurality of suitably constructed clamps 8'. Seated upon an off-set, formed on the pipe or casting 5, and sealing the expansion joint formed by the stuffing box 9 in connection therewith, is a nipple or thimble 10, said nipple being removably secured to the lowermost end of the casting 11 forming a part of the fuel feeding means.

The fuel feeding consists of a truck or frame 12, having a plurality of rollers or wheels 13 adapted to travel upon a plurality of rails 14 disposed and suitable supported at the desired distance above the top of the generator, said truck being provided with a fuel holding and feeding magazine 15 formed with a fuel receiving spout or opening 16 at its outer end, and with a fuel discharge spout or opening 17 at its inner end, the outer end of the receiving spout 16 being provided with a sealed gas tight closure 18 having a counter-balance 19, and the extreme inner end of the discharge spout is adapted to be sealed by a suitably constructed swinging gas tight sealing valve 20 provided with a counter-balance 21, said sealing valve when being swung into the open unsealed position, such as shown by the dotted lines in Fig. 1, serving to guide the fuel into the fuel feed opening 4 formed through the top of the generator. The fuel magazine 15 is formed with a casing having a shaft 22 centrally supported therethrough, said shaft having rigidly secured thereto a plurality of radiating revoluble vanes or blades 23, preferably four in all, each vane or blade being extended outwardly to the inner periphery of the said casing, and between each pair of the vanes or blades is disposed the certain required amount or proportion of fuel that may be desired to be fed at one time to the generator at each down run during the operation of making water gas.

It will be readily perceived by reference to Fig. 1 of the drawings, that when it is desired to feed the desired charge of fuel to the gas generator, it is simply necessary to swing the sealing valve 20 into the open position, shown by dotted lines, and the fuel will be readily directed into the fuel opening leading into the generator, and when said sealing valve is adjusted to the closed position, a one-fourth revolution of the shaft 22 will feed another charge of fuel to the discharge end of the magazine in readiness to be discharged at the proper time, thus three definite proportions and amount of fuel is always disposed within the fuel feeding magazine, one portion of the magazine being always empty, and at all times the feeding means is in sealed condition, that is, when feeding the fuel the outer sealing means 18 is tightly closed, and while the magazine is being filled with fuel, the sealing valve 20 is tightly closed, hence the sealing means hereinbefore referred to practically and efficiently prevents the possibility of any escape of the gas being generated in the generator under pressure to the atmosphere, and absolutely prevents any accident from explosion caused by the gas back-firing from the water gas apparatus.

Figure 3:
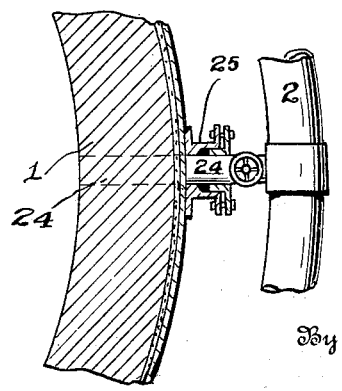
Figure 3 is a detail showing in section a portion of the wall of the generator, and in full lines a portion of the steam supply manifold.

It will be seen that the steam manifold 2 connected with the generator is provided with a series or any suitable number of outlet nozzles 24 connected therewith, each nozzle passing through a stuffing box 25, such as shown in Fig. 3, and through the wall of the generator 1 each nozzle being provided with a regulating or controlling valve 26, and adapted to inject a suitable amount of steam into the generator simultaneously as the fuel is fed therein, said nozzles being arranged in staggered relation with respect to the wall of the generator, so that the steam inlets will inject a certain volume of steam into the generator above the fuel bed in staggered relation to each other during the fuel charging operation and when a down run of gas is being made, whereby a more effective regulation of the steam for the down run of gas making is insured, and as the fuel is being fed into the generator, the steam ejected from each of said nozzles will cause the fine fuel to be blown against the highly heated fire clay lining of the generator, thereby promptly gasifying the said fine fuel, and any particles of the fuel that may not be thoroughly gasified are carried through the fuel bed into the hottest zone thereof, thus forcing a final and complete gasifying of the said fuel and eliminating the usual emission of dense black smoke being passed out into the atmosphere through the purge out stack while the apparatus is receiving its blow up before the succeeding up run of gas is made.

It will be understood that the fuel is delivered to the fuel feeding magazine by hand or any suitable mechanical power; that the truck or frame may be readily moved back when the fuel bed in the generator is being barred down, clinkered or cleaned; that the nipple or thimble 10 may be easily or readily detached by simply removing the securing nuts and bolts, and that the outer face of the magazine casing is provided with suitable means for indicating its proper operation.

The method of operation may be briefly described as follows:—

The fuel feeding means being ready for supplying a charge of fuel to the generator, in the manner such as shown in Fig. 1 of the drawings, and when it is desired to charge the generator with a certain amount of fuel during the down run only of the gas making process, it is simply necessary to swing open the sealing valve 20 when the desired amount of fuel will be immediately discharged through the hole or opening 4 and into the generator, and simultaneously as the fuel is falling toward the fuel bed of said generator it is subjected to a series of staggered streams of steam, injected from the steam manifold into the generator above the fuel bed therein, said streams of steam serving to separate and force the fine particles of fuel into direct contact with the highly heated fire-brick lining of the generator, which causes the fine fuel to be instantly gasified before passing into the fuel bed and such particles of the fine fuel that may not be completely gasified are forced through the fuel bed by the steam pressure and into its hottest zone, thus fully and thoroughly completing the final gasification of such fuel, thus assuring a saving and economy in fuel, and at the same time serving to eliminate the customary emission of the dense black smoke which is usually passed out into the atmosphere through the purge out stack.

It will be obvious that while my improved fuel charging method and means therefor may be utilized in connection with any of the usual fuels employed in connection with the manufacture of gas, it is especially desirable and effective in the utilization of bituminous coal as a fuel, and that the charging means is always in a sealed condition.

By my improved method of charging fuel into the generator or producer it will be evident that the usual necessity of idling the water gas set during the coaling period, which approximately is after each thirty-six minutes is entirely avoided, and the coaling period by the present hand methods consumes about one hundred and twenty minutes each twenty-four hours, while the present mechanical means for charging gas generators do not guarantee against the pressure of gas resulting from the operation of the apparatus backfiring or escaping into charging means, that may, at times result in serious danger or injury to person and property of the operating plant. This invention provided means serving to prevent such injury or accident, since the charging means is so constructed as to withstand the gas pressure, and all of the working parts are rendered gas proof. Further, my fuel charging means is so constructed, supported and connected that no strain whatever is placed on the crown of the gas generator.

Having thus described my invention what I claim and desire to secure by Letters Patent is:—

1. Means for feeding fuel into a gas generator, comprising a sealed portable fuel feeding magazine disposed above said generator, outwardly swinging means for closing and sealing the inlet to the magazine, and outwardly swinging means for closing and sealing the outlet to said magazine and serving to guide the fuel into the generator.

2. Means for feeding fuel into a gas generator, comprising an outwardly swinging portable fuel feeding magazine, a sealing cover connected with the inlet to said magazine, an outwardly swingable sealing valve for closing the outlet to the magazine and serving to direct the fuel into the generator, said magazine being removably connected to the generator and a detachable casting connected with the outlet end and to the generator.

3. Means for feeding fuel into a gas generator, comprising a portable fuel feeding magazine having a swinging sealing cover for sealing the inlet thereto, a swinging valve for sealing the outlet to said magazine, a casting connected with the outer end of the magazine, and a detachable thimble connected with said casting.

4. Means for feeding fuel into a gas generator, comprising a portable fuel feeding magazine adapted to contain a plurality of charges of fuel, means for sealing the inlet end of said magazine, means for sealing the discharge end of the magazine, a casting connected to its discharge end, and gas sealed means detachably connected with said casting.

5. Means for feeding fuel into a gas generator, comprising a portable fuel feeding magazine disposed above the generator, means for sealing the outlet from the magazine and serving to guide the discharge of the fuel, a casting secured to the discharge end of the magazine, a pipe clamped to the top of the generator, and a nipple detachably secured to said casting, and an expansion joint surrounding said nipple.

6. Means for feeding fuel into a gas generator, comprising a portable fuel receptacle formed with a plurality of pockets filled with a predetermined amount of fuel charge, gas sealing means secured to the fuel inlet, and outwardly swinging sealing valve connected with the fuel outlet of said receptacle, a casting rigidly secured to the discharge end of the receptacle, and a detachable thimble converted with said casting.

THOMAS F. HOLDEN.